United States Patent
Gehin et al.

(10) Patent No.: US 10,442,635 B2
(45) Date of Patent: Oct. 15, 2019

(54) CONVEYING DEVICE HAVING SEVERAL OUTPUTS

(71) Applicant: SIDEL ENGINEERING & CONVEYING SOLUTIONS, Reichstett (FR)

(72) Inventors: Anthony Gehin, Reichstett (FR); Patrick Hutter, Reichstett (FR)

(73) Assignee: SIDEL ENGINEERING & CONVEYING SOLUTIONS, Reichstett (FR)

( * ) Notice: Subject to any disclaimer, the term of this patent is extended or adjusted under 35 U.S.C. 154(b) by 0 days.

(21) Appl. No.: 16/076,665

(22) PCT Filed: Feb. 17, 2017

(86) PCT No.: PCT/FR2017/050361
§ 371 (c)(1),
(2) Date: Aug. 8, 2018

(87) PCT Pub. No.: WO2017/140992
PCT Pub. Date: Aug. 24, 2017

(65) Prior Publication Data
US 2019/0039835 A1 Feb. 7, 2019

(30) Foreign Application Priority Data

Feb. 19, 2016 (FR) ..................... 16 51383

(51) Int. Cl.
*B65G 47/71* (2006.01)
*B65G 47/69* (2006.01)
(Continued)

(52) U.S. Cl.
CPC ............. *B65G 47/71* (2013.01); *B65G 47/69* (2013.01); *B65G 47/845* (2013.01); *B65G 47/82* (2013.01)

(58) Field of Classification Search
CPC ...... B65G 47/71; B65G 47/69; B65G 47/845; B65G 47/82; B65G 47/5131;
(Continued)

(56) References Cited

U.S. PATENT DOCUMENTS

| 3,481,107 A | 12/1969 | Andblad et al. |
| 5,546,734 A | 8/1996 | Moncrief et al. |

(Continued)

FOREIGN PATENT DOCUMENTS

| CA | 2146444 C | 10/2005 |
| DE | 1786484 A1 | 10/1971 |

(Continued)

OTHER PUBLICATIONS

International Search Report, dated Apr. 12, 2017, from corresponding PCT application No. PCT/FR2017/050361.

*Primary Examiner* — Mark A Deuble (57) ABSTRACT

Disclosed is a conveying device including an upstream conveying unit for receiving products from at least one upstream station, an accumulation surface along which the upstream conveying unit circulates, a loading unit for moving the products from the upstream conveying unit to the accumulation surface, a downstream conveying unit for clearing the products, and an unloading unit for moving the products from the accumulation surface to the downstream conveying unit. The downstream conveying unit includes a plurality of independent moving unit receiving the products in receiving zones which are successively distributed from the edge of the accumulation surface opposite the edge along which the upstream conveying unit extends. Also disclosed is a corresponding method.

20 Claims, 6 Drawing Sheets

(51) Int. Cl.
*B65G 47/84* (2006.01)
*B65G 47/82* (2006.01)

(58) Field of Classification Search
CPC .. B65G 47/5113; B65G 47/844; B65G 37/00; B65G 47/53; B65G 47/682
USPC .................................................. 198/429–430
See application file for complete search history.

(56) References Cited

U.S. PATENT DOCUMENTS

| | | | |
|---|---|---|---|
| 5,706,633 A | 1/1998 | Moncrief et al. | |
| 5,711,137 A | 1/1998 | Moncrief et al. | |
| 8,096,404 B2* | 1/2012 | Eschlbeck | B65G 1/1378 |
| | | | 198/429 |
| 8,167,113 B2 | 5/2012 | Mougin et al. | |
| 8,931,617 B2* | 1/2015 | Gut | B07C 5/3408 |
| | | | 198/370.02 |
| 9,505,562 B2 | 11/2016 | Petrovic | |
| 9,878,855 B2* | 1/2018 | Gehin | B65G 37/00 |
| 2010/0219043 A1* | 9/2010 | Baumann | B65G 47/31 |
| | | | 198/419.2 |
| 2014/0119875 A1 | 5/2014 | Job et al. | |
| 2014/0332344 A1* | 11/2014 | Jodoin | B65G 47/90 |
| | | | 198/448 |
| 2016/0159583 A1* | 6/2016 | Keil | B65G 47/71 |
| | | | 198/440 |
| 2018/0312346 A1* | 11/2018 | Klotz | B65G 47/71 |
| 2019/0014799 A1* | 1/2019 | Hahn | B65B 57/14 |

FOREIGN PATENT DOCUMENTS

| | | |
|---|---|---|
| EP | 2 163 498 A1 | 3/2010 |
| EP | 2 204 342 A1 | 7/2010 |
| EP | 2402269 A1 | 1/2012 |
| WO | 2014/076390 A1 | 5/2014 |

* cited by examiner

CONVEYING DEVICE HAVING SEVERAL OUTPUTS

BACKGROUND OF THE INVENTION

Field of the Invention

This invention relates to the industrial handling of assembly line products on a line of the packaging line type, and has as its object, on the one hand, a conveying device and, on the other hand, a method using this device.

In this field, there is a need to create, from a single stream, several different streams that each feed a machine.

Description of the Related Art

Thus, CA2146444 discloses a solution in which a stream of products in batches is separated into lanes for a single product in front, then, by changing direction, these lanes create streams each several products wide. However, there are numerous problems both in the separation of a staggered stream into several lanes and in the obtaining of non-staggered arrays downstream.

DE1786484 discloses a solution for division of a single-line stream into several lanes, from a transfer wheel that drops the products into the lanes. Such a principle, however, does not make possible any accumulation and creates at the output only streams a single product wide.

EP 2402269 further proposes, for example, a solution for diverting a multi-line upstream stream to various lanes. This principle is based on controlled push-rods that divert the product as a function of the position thereof. However, it is difficult to adapt such a principle to output streams several products wide, as well as to a large number of parallel streams. Further, the operating speed is limited and the possibilities of accumulation zero.

Such solutions based on a diverter also have a significant drawback when the downstream machines are positioned side by side. Actually, it is then necessary to provide curved conveyors that connect a single point to downstream machines that are spaced apart from one another.

Finally, WO2014/076390, which discloses a solution in which an incoming stream of products is transferred transversely onto an accumulation surface, is also known. The products, resting in longitudinal columns next to one another, are then transferred transversely to an output conveyor. Thus, the necessity of passing by a stream of batches between a single-line movement and a movement of several lanes is avoided.

SUMMARY OF THE INVENTION

To do this, the invention proposes creating an accumulation surface, bordered by the feeding of products on one side, and, on the other, a transverse series of receiving zones where the products can be deposited each time on an autonomous movement means, of the conveyor belt type, cart or otherwise, each receiving zone being used to feed a downstream station.

The invention thus has as its object a conveying device comprising an upstream conveying means to receive products from at least one upstream station, an accumulation surface along which the upstream conveying means travels, a loading means to move the products from the upstream conveying means as far as onto the accumulation surface, a downstream conveying means to remove the products, as well as an offloading means to move the products from the accumulation surface as far as onto the downstream conveying means.

This device is characterized in that the downstream conveying means comprises a plurality of independent movement means that receive the products in receiving zones that are successively distributed from the edge of the accumulation surface that is opposite the one along which the upstream conveying means extends.

The invention also has as its object a method used by this device, namely a method for conveying products traveling on an upstream conveying means that carries them in a single-line column in a conveying direction, then on a parallel downstream conveying means, comprising steps consisting in loading an accumulation surface by pushing the products transversely there from the upstream conveying means, offloading the accumulation surface by moving the products transversely onto the downstream conveying means, removing the products as a result of the movement of the downstream conveying means.

This method is characterized in that the downstream conveying means comprises a plurality of independent movement means, the products being removed in batches onto one or the other of these independent movement means.

BRIEF DESCRIPTION OF THE DRAWINGS

The invention will be better understood as a result of the description below, which is based on possible embodiments, which are explained in a way that is illustrative and in no way limiting, with reference to the accompanying figures, in which.

finally, FIG. 6 diagrams a section with a tool for the loading and a tool for the offloading.

DESCRIPTION OF THE PREFERRED EMBODIMENTS

The invention therefore has first of all as its object a conveying device 1 comprising an upstream conveying means 2 to receive products 3 from at least one upstream station, an accumulation surface 4 along which the upstream conveying means 2 travels, a loading means 5 to move the products 3 from the upstream conveying means 2 as far as onto the accumulation surface, a downstream conveying means 6 to remove the products 3, as well as an offloading means 7 to move the products 3 from the accumulation surface 4 as far as onto the downstream conveying means 6. The accumulation surface 4 is located between, on the one hand, the upstream conveying means 2 and, on the other hand, the downstream conveying means 6.

The products 3 are preferably behind one another in a single-line column, and therefore with no staggering, in a column of one or more products 3 wide, with a separation between them, optionally non-controllable, or in contact.

The upstream conveying means 2 extends adjacent to the accumulation surface 4 and takes the form of at least one endless conveyor belt, on the surface of which the products 3 are placed. The upstream conveying means 2 can extend beyond the accumulation surface 4 optionally to feed another from it. The conveying device 1 can actually be provided with several different accumulation surfaces 4, distributed along the upstream conveying means 2, on one side or the other.

The accumulation surface 4 can be a stationary plate or a conveyor that moves the products 3 perpendicular to the upstream conveying means 2.

"Accumulation surface" within the meaning of the invention is defined as a surface positioned between two upstream and downstream pieces of equipment (in this particular case for the accumulation surface 4, it is a matter of the upstream conveying means 2 and the downstream conveying means 6) that make it possible to manage the stream of articles conveyed between these two pieces of equipment by accumulating articles in such a way in particular that the operation of one of the pieces of equipment can be modified (change in operating speed, stopping . . . ), without impacting the operation of the other.

Thus, the accumulation surface 4 must be large enough to be able to store a large quantity of products 3 to as to be able to manage the stream of products 3 better.

In particular, its dimension that is the length of the movement of the products 3 can contain several products 3 and preferably more than 10 products 3, in particular more than 20 products 3, preferably more than 30 products 3.

The loading means 5 works by sweeping across then immobile products 3 on the upstream conveying means 2, and therefore pushes the products 3 transversely onto the accumulation surface 4 adjacent to which the upstream conveying means 2 travels. The products 3 are therefore stopped when the loading means 5 acts, and a buffer solution can be provided to guarantee a continuous stream of products 3 upstream from the conveying device 1, when the products 3 must regularly be stopped.

The upstream conveying means 2 thus carries the products 3 in a conveying direction 11, and the same applies for the downstream conveying means 6, which is on the other side of the accumulation surface 4 in relation to the upstream conveying means 2. They therefore form solutions of parallel conveying, on one side or the other of the accumulation surface 4. The loading of products 3 onto the at least one accumulation surface 4 takes place for a portion of the stream in the conveying direction 11 and therefore a batch of products 3, and the offloading of the at least one accumulation surface 4, on the opposite side, onto the downstream conveying means 6, also takes place for a portion of products 3 in this direction, preferably for a portion of the same length, or possibly also of the same width. The loading means 5 and offloading means 7 are therefore adapted to move several products 3 simultaneously and preferably to move simultaneously at least one column of products 3 parallel to the conveying direction 11 whose length can in particular correspond to the length of the dimension of the accumulation surface that borders the movement of the products 3 on the upstream conveyor 2.

Preferably, the loading means 5 and offloading means 7 extend parallel to the conveying direction 11 over the entire length of the accumulation surface 4.

Preferably, the loading means 5 is able to deposit products 3 onto the accumulation surface 4 at different locations of the latter to decorrelate the loading cycle from the offloading cycle. In other words, the products moved by the loading means can be deposited in any area along the axis perpendicular to the conveying direction 11. In particular, a row of products 3 can be placed on the accumulation surface 4 parallel to the conveying direction 11 and adjacent to a row of products 3 already placed on this surface so as to optimize the available space. It is understood that the products 3 that are newly placed on the accumulation surface 4 are closer to the upstream conveying means 2 than the products 3 that were already present on the accumulation surface 4.

An advantage of this configuration is that it is possible to offload onto the downstream conveying means 6 products 3 that are organized into several columns in the conveying direction 11, each one single-line and a single product 3 wide, side by side, and therefore without any staggering or interlocking of the products 3. Thus avoided are the problems and difficulties associated with the elimination of this staggering to feed a downstream device in which the products 3 travel in lanes, such as a bundler, for example.

The offloading means 7 can slide onto the downstream conveying means 6 several longitudinal rows of products 3 simultaneously, in particular two segments side by side each one product 3 wide.

The loading means 5 as well as the offloading means 7 can have a cap, moved by a multi-axis actuator and which is placed on the products 3, either in the area of the upstream conveying means 2 to slide them onto the at least one accumulation surface 4 transversely to the conveying direction 11, or in the area of the at least one accumulation surface 4 to slide them onto the downstream conveying means 6, here also transversely to the conveying direction 11. Such a cap is placed on the products 3 to be handled from above. It may also be a simple push-rod, in which case such a push-rod can simply approach the products 3 by their side, parallel to the common plane of the accumulation surface 4, the upstream conveying means 2 and the downstream conveying means 6. A flush mounting avoids unbalancing the products 3 when they travel to or from the accumulation surface 4.

Figure 6:
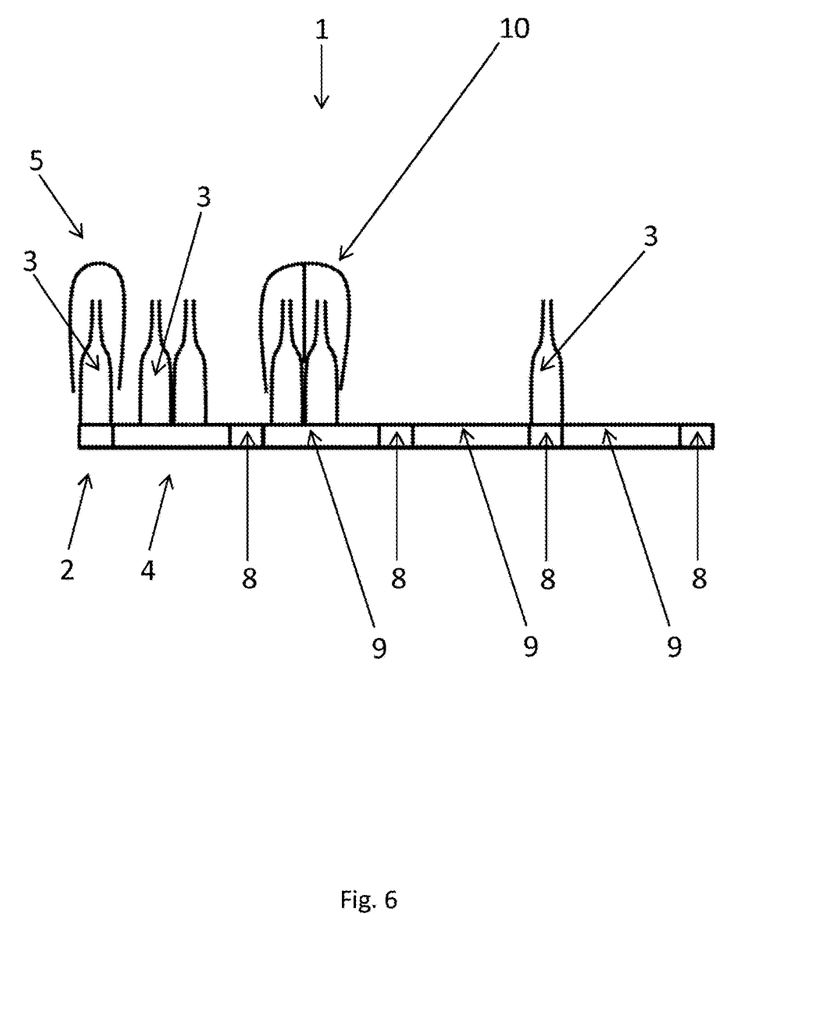

A cap can be simple, such as, for example, that of the loading means 5 shown in FIG. 6. Such a cap makes it possible to move a column of products 3 all at once and comprises two approximately vertical outside edges that extend in the conveying direction on both sides of the column of products 3.

A cap can also be multiple, and particularly double, such as, for example, that of the offloading means 7 shown in FIG. 6. Such a cap makes it possible to move several columns 3 of products all at once. In addition to the two outside edges, it comprises one or more vertical plate(s) between the outside edges parallel to the latter and designed to separate the various columns to be moved. A double cap thus comprises a vertical plate between the two outside edges so as to move simultaneously two columns of products 3.

Thus, a multiple cap advantageously makes it possible to slide simultaneously several columns of products 3 all while avoiding the staggering between the products.

The action on the products 3 of the loading means 5 and of the offloading means 7 is essentially a flat, preferably linear, push parallel to the plane of the accumulation surface 4. Both the loading means 5 and the offloading means 7 can comprise a jointed robot and/or a set of sliding channels to be moved along the length of the action to be performed on the products 3.

The upstream conveying means 2 as well as the downstream conveying means 6 each can have a plurality of different conveying belts, each being set in motion by a dedicated motor, so that the speed of movement of these belts, and therefore of said means, can be varied and controlled.

According to the invention, the downstream conveying means 6 comprises a plurality of independent movement means that receive the products 3 in receiving zones that are successively distributed from the edge of the accumulation surface 4 opposite the one along which the upstream conveying means 2 extends, particularly independent movement means in the form of independent moving carts, or else output conveyors 8, of the conveyor belt type, each then being preferably motorized and controllable in its movement independently from the others. The downstream conveying means 6 has a plurality of independent movement means that follow each other perpendicular to the conveying direction 11, continuously or at least during the offloading of the products 3 onto it.

Thus, according to a possible additional characteristic, at least one independent movement means takes the form of an autonomous moving cart, which, to receive the products 3 from the offloading means 7, is temporarily placed in one of the receiving zones, and is moved to remove them. According to another possible additional characteristic, combined or alternate, at least one independent movement means takes the form of an independent linear output conveyor 8, extending from one of the receiving zones.

The downstream conveying means 6 forms the output of the conveying device 1 and makes it possible for it to bring the products 3 to the downstream station, to which it must supply them. The at least one output conveyor 8 that the downstream conveying means 6 comprises is therefore preferably connected to the input of a handling station ensuring the continuation of the process, directly or using at least one other conveyor.

The output conveyors 8 are alongside each other, as the figures show, and therefore the same is true for the receiving zones from which they extend or from which carts can receive the products 3. The receiving zones and the output conveyors 8 therefore follow each other transversely in the conveying direction 11, from the edge of the at least one accumulation surface 4 opposite the one where the upstream conveying means 2 travels. Thus, the upstream conveying means 2, made of a single or several conveyors, is found on one side of the accumulation surface 4, whereas the downstream conveying means 6, formed by several independent movement means, is found on the other side of this surface.

Each output conveyor 8 can therefore be set in motion independently, and the same is true for carts. This thus makes it possible to offload the contents of the at least one accumulation surface 4 onto one or the other of the movement means.

The conveying device 1 thus has an input for products 3, in the form of the upstream conveying means 2, and several parallel outputs for products 3 in the form of a downstream conveying means 6 comprising several independent output conveyors 8, or generally movement means that receive the products 3 from receiving zones distributed transversely from the edge of the accumulation surface 4. The offloading means 7 therefore deposits the products 3 on one or the other of the output conveyors 8 or one or the other of the carts, each time in a batch of a single column or of several columns next to one another.

An output conveyor 8 can therefore be set in motion while another is stopped, etc. This makes it possible for the offloading means 7 to deposit products 3 on an output conveyor 8 that is stopped or at very low speed, while another output conveyor 8, on which it has deposited products 3 previously, travels at a different speed to remove the products 3 that rest on it to a downstream handling station.

It will be noted that for each cycle, the offloading means 7 handles the products 3 that are closest to the edge of the accumulation surface 4 where the downstream conveying means 6 is found. It deposits them on one, even several, movement means of the downstream conveying means 6. Since these conveyors 8 are following one another, bringing the products 3 onto one of them can necessitate having them travel on at least one other movement means first.

The conveying device 1 preferably has a control unit to monitor and coordinate the operation of the upstream conveying means 2, and/or of the loading means 5 and/or of the offloading means 7 and/or of the downstream conveying means 6, namely the various movement means that it comprises. As will be further specified below, it is conceivable that at least one of the output conveyors 8 can travel in both ways the length of its direction, which, for example, can be done by providing two motors for such a conveyor.

According to a possible additional characteristic, the offloading means 7 is able to deposit products 3 in at least two different receiving zones. The offloading means 7 therefore works cyclically and removes products 3 from the at least one accumulation surface 4 to deposit them on a movement means, then returns to search for products 3 on said surface to deposit them on a movement means, optionally another, etc. Of course, the number of products 3 handled can change every time.

Since the receiving zones follow one another transversely in the conveying direction 11, the products 3 can be made to pass onto another movement means before reaching the one onto which they will be delivered.

Preferably, the offloading means 7 is formed by a set of horizontal sliding channels, thus parallel to the horizontal plane in which the accumulation surface 4, the upstream conveying means 2 and the downstream conveying means 6 are found, on which is mounted a gantry that is mobile along these sliding channels that are transverse to the conveying direction 11, a tool that works with these products 3 being mounted to move at least vertically there, even also in the conveying direction 11, to act on the products 3, by pushing them from the side, after having optionally capped them from above for a better hold. The offloading tool 7 preferably does not, however, lift the products 3, which makes it possible to maintain a lightweight and dynamic tooling. These sliding channels preferably extend over the entire downstream conveying means 6 and therefore all of the successive receiving zones.

Such a design is also conceivable for the loading means 5, the sliding channels then extending, of course, in the area of the upstream conveying means 2.

Figure 1:
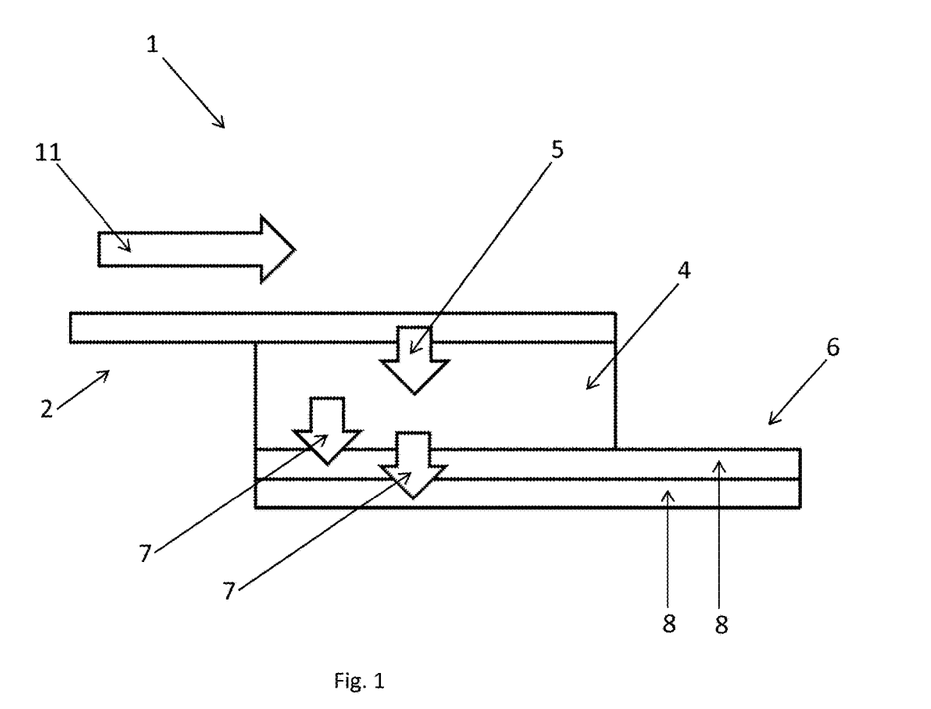
FIG. 1 shows an embodiment of the invention where the output conveyors are directly adjacent to one another.
Figure 2:
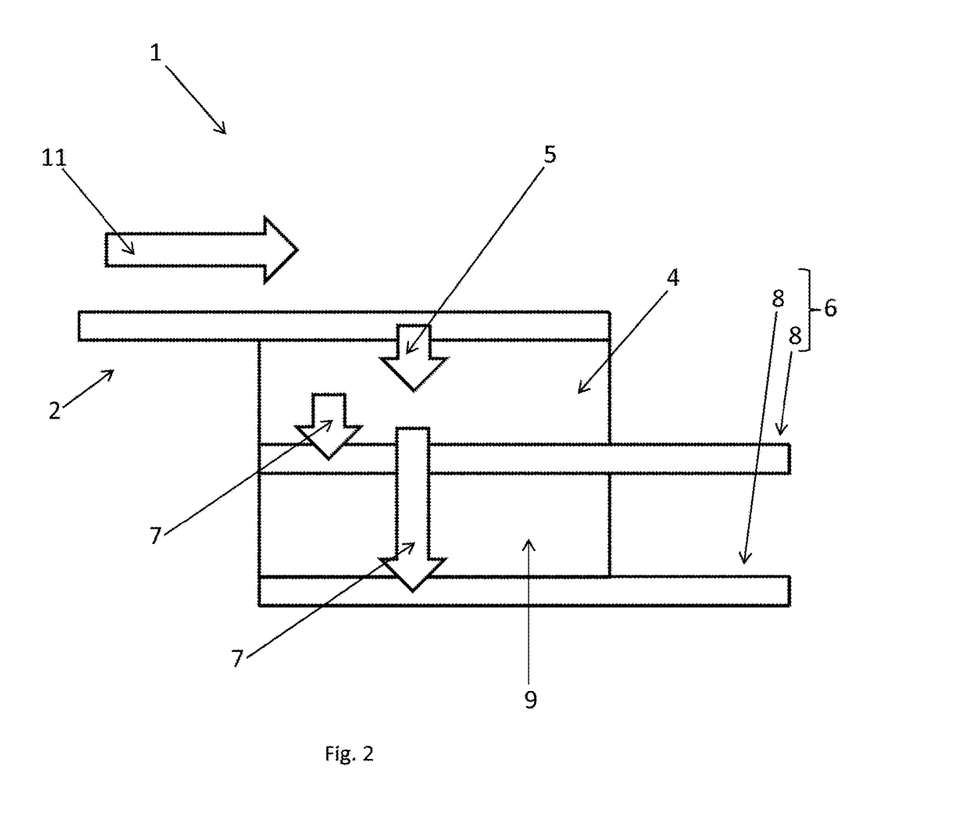
FIG. 2 shows an embodiment where two output conveyors are separated by a transfer surface.

According to a possible additional characteristic of the conveying device 1, it comprises, for at least one pair of successive receiving zones, a transfer surface 9 mounted between them, particularly a transfer surface 9 mounted between two output conveyors 8. FIG. 1 shows the case of receiving zones or of output conveyors 8 directly following one another perpendicular to the conveying direction 11, whereas FIG. 2 shows an embodiment with a transfer surface in-between.

The transfer surface 9 is located in the same area as the two output conveyors 8 between which it is found, these two conveyors being at the same height, or alternatively in the same area as the carts that arrive in and depart from the receiving zone. The conveying device 1 therefore has a receiving surface with successive flush elements, namely the upstream conveying means 2, the accumulation surface 4, the output conveyors 8 or the upper surface of the carts, and the transfer surfaces 9.

The transfer surface 9 is therefore found between two output conveyors 8, so as to form, transversely to the conveying direction 11, an alignment with an output conveyor 8, with a transfer surface 9, then with another output conveyor 8. The same is true for carts, as the case may be.

The at least one transfer surface 9 can be a stationary plate, which therefore does not carry along the products 3, or else a plate having particularly reduced adhesion, such as with a cushion of air or freely-rotating balls, or else a surface that carries the products 3 along transversely to the conveying direction 11, for example a moving belt.

The advantage of having such a transfer surface 9 is that it is possible to have output conveyors 8 that are linear and parallel, therefore simple and not very expensive, each linked directly to a downstream station. The placement is therefore such that the spacing between the downstream stations is repeated in the area of the output conveyors 8, which therefore makes possible an optimal line configuration, with a conveying device 1 that distributes the products 3 that it receives on an upstream conveying means 2 to different stations downstream, thanks to different output conveyors 8 that are parallel and spaced so as to repeat the spacing of said stations.

In the conveying device 1, the products 3 therefore undergo a flat movement from the upstream conveying device 2, the accumulation surface 4, the output conveyors 8 or carts and the transfer surfaces 9. The flush transfer surface 9 makes it possible to avoid having to lift the products 3 to be brought to a straight and remote output conveyor 8, and thus makes it possible to use a lightweight and dynamic tooling.

Such a transfer surface 9 can also be used to receive products 3 to be deposited on a movement means still farther away, and then to provide the offloading means 7 in the form of two tools 10 that work simultaneously, the first bringing products 3 that the other will handle while the first loads the next ones, etc. The cycle time can thus be reduced, or in other words, the size of the conveying device 1 transversely to the conveying direction 11 can be substantially increased and matched with the arrangement and the spacing of the downstream stations.

Thus, according to a possible additional characteristic, the offloading means 7 is able to dump products 3 onto the at least one transfer surface 9. It thus exerts a flat movement, parallel to the at least one accumulation surface 4, on the products 3 from the at least one accumulation surface 4 onto the transfer surface 9. Once arrived on the transfer surface 9, the tool with which it is provided to come into contact with the products 3 rises high enough to be able again to perform a return movement to the accumulation surface 4, parallel to it, without touching the products 3 and therefore being higher than they are. During this time, another tool 10 of the offloading means 7 grabs the products 3 that are waiting on the transfer surface 9 and brings them onto the desired movement means.

The products 3 are therefore deposited stationary by the first tool 10 while waiting for their handling by the second tool 10. The products 3 are stopped on a transfer surface 9, but they could also be deposited by the first tool 10 on a movement means that is then preferably immobile.

The offloading means 7 can comprise more than two tools 10 that work one after the other on the products 3 to ensure their deposit on the predetermined movement means from among the plurality of the downstream conveying means 6.

The work range of each tool 10 of the offloading means 7 can be all or part of the width of the conveying device 1 perpendicular to the conveying direction 11.

Thus, in certain embodiments, the offloading means 7 comprises a single tool 10, which can remove products 3 in each of the receiving zones, and, as the case may be, onto each transfer surface 9. The offloading means 7 is therefore relatively simple. The same tool 10 can therefore be made to travel above one or more movement means before reaching the one where it must deposit the products 3.

In other embodiments, the offloading means 7 comprises at least two separate tools 10, which successively handle the products 3, namely a first tool 10 able to search for the products 3 on the at least one accumulation surface 4, and at least a second tool 10 able to deposit the products 3 on a movement means, cart or output conveyor 8. The offloading means 7 brings the products 3 onto at least one of the movement means as a result of the successive action of several tools 10. The first tool 10 of this series removes the products 3 from the at least one accumulation surface 4, and the last tool 10 deposits the products 3 on a movement means.

The offloading means 7 can have more tools 10, such as an intermediate third tool 10 that searches for the products 3 downstream to the accumulation surface 4 and deposits them upstream from the destination movement means.

Each tool 10 can therefore be moved independently of the other tool or tools 10. The various tools 10 can be moved on the same set of sliding channels or track.

According to another possible additional characteristic, at least one transfer surface 9 forms a buffer zone where products 3 can be stored temporarily in an intermediate way between the accumulation surface 4 and the independent movement means that must remove them. Thus, the offloading means 7 acts in two steps to bring the products 3 onto the movement means concerned. This means also that the offloading means 7 can manage simultaneously several batches of products 3 to bring them to the proper movement means, each batch corresponding to a group of products 3 removed initially at one time from the accumulation surface 4.

The products 3 therefore pass by at least one intermediate buffer zone between the accumulation surface 4 and the intended movement means. Of course, bringing the group of products 3 onto the proper movement means is done optionally with more than two operations of tool 10.

In certain conceivable cases, the at least one transfer surface 9 is a motorized carrying surface and carries the products 3 transversely in the direction of the independent movement means. Thus, the transfer surface 9 ensures the movement of the products 3 transversely to the conveying direction 11, particularly between two movement means, carts or output conveyors 8.

In certain possible configurations, the at least one output conveyor 8 can travel, depending on the case, in one direction or the other, particularly as a result of a pair of drive motors each working at one end of the closed loop that the output conveyor 8 forms. It is thus possible to obtain line placements with downstream stations distributed on one side or the other of an axis formed by the series of output conveyors 8 and transfer surfaces 9, in the extension of the accumulation surface 4.

It is understood from this description that the conveying device 1 has a function of distribution between one or more input channels and several output channels, each output channel being supplied in the area of a receiving zone. It can also have a function of accumulation between the at least one input and the outputs, as a result of an accumulation surface 4, even at least one transfer surface 9.

The invention also has as its object a method using the device as described above, namely a method for conveying products 3 traveling on an upstream conveying means 2 that carries them in a single-line column in a conveying direction 11, then onto a parallel downstream conveying means 6, comprising steps consisting in     loading an accumulation surface 4 by pushing the products 3 there transversely from the upstream conveying means 2,     offloading the accumulation surface 4 by moving the products 3 transversely onto the downstream conveying means 6,     removing the products 3 as a result of the movement of the downstream conveying means 6, particularly removing them in a single single-line column or in several single-line columns next to one another.

The products 3 move parallel on the upstream conveying means 2 and downstream conveying means 6, placed along opposite edges of the accumulation surface 4.

According to the invention, the downstream conveying means 6 comprises a plurality of independent movement means, the products 3 being offloaded by batch onto one or the other of these independent movement means, particularly in the form of output conveyors 8 or of carts. The batches loaded on the accumulation surface 4 by the loading means 5 can correspond to the batches offloaded subsequently by the offloading means 7, and even correspond to the batches removed by the downstream conveying means 6. Of course, it is conceivable that the products 3 are handled in the form of a different group size every time.

The upstream conveying means 2, the downstream conveying means 6, the transfer surface or surfaces 9, are therefore found in the extension of the accumulation surface 4, perpendicular to the conveying direction 11. Once stopped on the upstream conveying means 2, the products 3 undergo—as a result of the successive action, on the one hand, of the loading means 5, then, on the other hand, of the offloading means 7, even of the accumulation surface 4 if it is motorized and/or of the transfer surface or surfaces 9 as the case may be—a movement perpendicular to the conveying direction 11 up to the downstream conveying means 6, then a movement in the conveying direction 11 as a result of the downstream conveying means 6.

The at least one accumulation surface 4 therefore separates the upstream conveying means 2 from the downstream conveying means 6. The offloading means 7 removes the products 3 from the accumulation surface 4 and places them by groups distributed transversely to the conveying direction 11, onto a movement means, in a receiving zone, or else temporarily onto a transfer surface 9.

A step can then consist in defining the exact location where the offloading means 7 dumps the products 3 temporarily or finally, namely one of the specific movement means, or else the or a transfer surface 9.

According to a possible additional characteristic, the removal of products 3 from the accumulation surface 4 as far as onto the independent movement means is composed of several successive cycles of transverse movement, each carried out by a different tool 10, so that, during each cycle, the products 3 successively approach the intended movement means. It is thus possible that the depositing of the products 3 in the proper location is done by tools 10 working in parallel, which reduces the cycle time.

Finally, according to another possible additional characteristic of the method, it comprises, between two movement cycles, at least one additional step for accumulation of products 3 after they are taken onto the accumulation surface 4 and before they are deposited on an independent movement means, in particular a step for accumulation on a stopped movement means, cart or output conveyor 8, even a step for accumulation on a transfer surface 9 located between the accumulation surface 4 and the movement means, with the products 3 then being taken to the accumulation surface 4 and then delivered onto the transfer surface 9 by the offloading means 7, then again taken onto the transfer surface 9 and delivered onto the movement means.

In the embodiment illustrated in FIG. 1, the conveying device 1 has an upstream conveying means 2 in the form of a single conveyor belt, or input conveyor 12. The products 3 are of the bottle, can, pouch, or other flask type having therefore a great height relative to its base and thus being unstable, or else of the box or case type, which can then be much more stable. Generally, the product 3 is a container or otherwise.

Preferably, the products 3 are all identical. In other words, they have the same format, consist of the same materials, and if they contain something, they all contain the same thing.

The products 3 rest on the moving input conveyor 12 and are therefore carried by it. The upstream conveying means 2 is essentially linear and moves the products 3 in a conveying direction 11. It extends along an edge of an accumulation surface 4.

This accumulation surface 4 is preferably essentially rectangular, with two edges parallel to the conveying direction 11 and two perpendicular edges. The upstream conveying means 2 extends along one of the edges parallel to the conveying direction 11. The products 3 are loaded onto the upstream conveying means 2 one after the other, in a column that is a single product 3 wide, or in a column several products 3 wide. The products 3 can optionally also be in batches and have different orientations for each of them.

Figure 5:
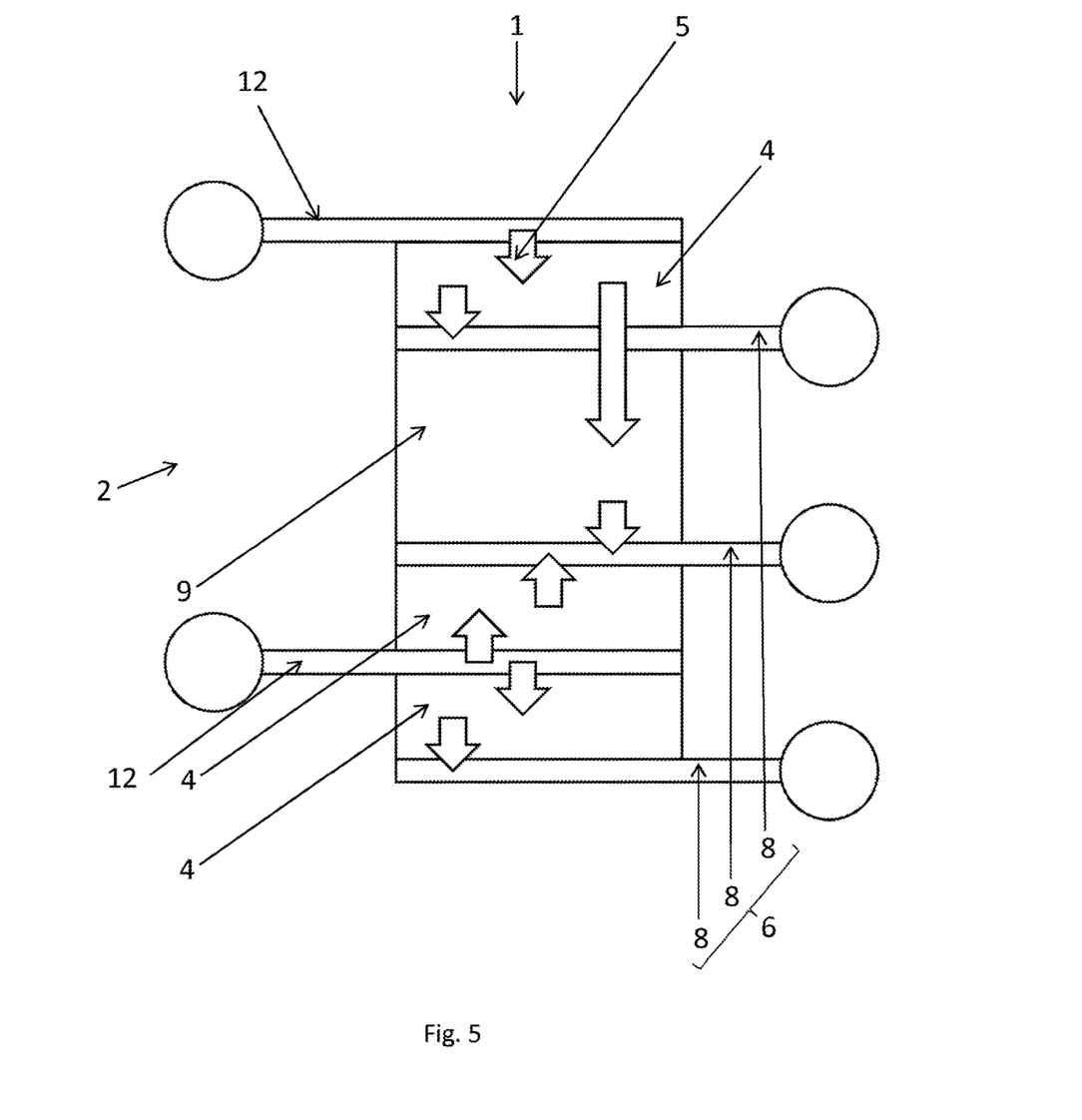
FIG. 5 shows a configuration with several upstream stations and several downstream stations.

The conveying device 1 can have a plurality of accumulation surfaces 4, which the upstream conveying means 2 then borders every time. FIG. 5 shows, for example, a conveying device 1 with an upstream conveying means 2 comprising two input conveyors 12, two accumulation surfaces 4, and a downstream conveying means 6 comprising three output conveyors 8.

The conveying device 1 also comprises a loading means 5, which is used to move products 3 from the upstream conveying means 2 as far as onto the at least one accumulation surface 4. The products 3 are thus stopped when they must be moved onto the accumulation surface 4. They then form a stopped batch that extends adjacent to one side of the accumulation surface 4. The loading means 5 then pushes the batch of products 3 from the upstream conveying means 2 as far as onto the accumulation surface 4. This action is essentially perpendicular to the conveying direction 11. A batch of products 3 formed from a column portion at least one product 3 wide is therefore swept transversely as far as onto the accumulation surface 4.

It will be noted that the upstream conveying means 2 can comprise an accumulation solution that makes it possible to combine, on the one hand, an upstream continuous stream, and, on the other hand, the stopping of the products 3 for their transverse transfer by sweeping as far as onto the accumulation surface 4.

The products 3 loaded by transverse sweeping from one side of the accumulation surface 4 along which the upstream conveying means 2 travels are delivered onto the accumulation surface 4 somewhere between this side and the opposite side, particularly as a function of production needs and of products 3 already present.

The advantage of such an accumulation by transverse sweeping is that the products 3 accumulate little by little without staggering between the successive batches, in the form of a stream of greater width than the one on the upstream conveying means 2.

The conveying device 1 also has an offloading means 7 that aims to bring products 3, present on the accumulation surface 4, as far as onto a downstream conveying means 6, as a result of which they are removed and brought downstream from the conveying device 1. As the attached figures show, the downstream conveying means 6 comprises a plurality of separate output conveyors 8, which can therefore be controlled independently of one another. In certain embodiments, the downstream conveying means 6 comprises independent carts, even a combination of output conveyors 8 and of carts. The products 3 are brought onto the downstream conveying means 6 in the area of output zones where, temporarily or continuously, the independent movement means, carts or output conveyors 8, are found.

Each movement means, cart or output conveyor 8, has a speed that is specific to it, so that it can be moving or stopped, independently of the status of the other movement means. Each output conveyor 8 is linked to a downstream handling station that it feeds. Thus, the conveying device 1 can feed several downstream stations independently every time, thanks to movement means 8 that are specific to them every time, and therefore operate with an operating speed tied to the needs of said station.

Of course, to facilitate adjustment and control, a series of several conveyors can be conceived to feed the same downstream station. The downstream station is therefore fed by an output conveyor 8 directly or by means of at least one other conveyor.

The products 3 are deposited on the output conveyor 8 in the form of a batch one product 3 wide or several products 3 wide, and long, in the conveying direction 11 about the length of the accumulation surface 4. The configuration of the batch can vary for each movement means, one being provided with a batch one product 3 wide, another with a batch two products 3 wide, etc.

As the accompanying figures show, the downstream conveying means 6, and therefore all of the output conveyors 8 that constitute it and the receiving zones from where the movement means travel, extends adjacent to the edge of the accumulation surface 4 opposite the one where the upstream conveying means 2 is found. The batches of products 3 that are loaded onto the accumulation surface 4 thus have the same dimension in the conveying direction 11 as the batches of products 3 that are offloaded onto the downstream conveying means 6.

The upstream conveying means 2, the accumulation surface 4 and the downstream conveying means 6, particularly its receiving zones, therefore follow each other transversely to the conveying direction 11.

The offloading means 7 operates by coming above the products 3 that are on the accumulation surface 4, along the edge opposite the one where the upstream conveying means 2 is found. Like the loading means 5, it then pushes them by a movement parallel to the accumulation surface 4 as far as onto the downstream conveying means 6.

The offloading means 7 pushes a batch at least one product 3 wide from the accumulation surface 4 as far as onto one of the particular movement means, as a function of the needs of the array of machines placed downstream. The offloading means 7 therefore removes every time a batch of products 3 and deposits it on one of the movement means, in cart form or output conveyor 8 form. In each cycle, the offloading means 7 searches for a batch and deposits it on a movement means that can be different every time. Of course, the batch of products 3 removed from the accumulation surface 4 during a cycle can be deposited by successive portions onto several different movement means.

For example, the loading means 5 can feed the accumulation surface 4 with batches one, even two, products 3 wide, while the offloading means 7 removes with each cycle a batch of products 3 four, six or more products 3 wide, which then makes it possible to feed directly several bundling machines, for example.

In other words, the offloading means distributes onto different parallel output conveyors 8 the products 3 that it removes from the accumulation surface 4, and therefore distributes them into several successive receiving zones.

Figure 3:
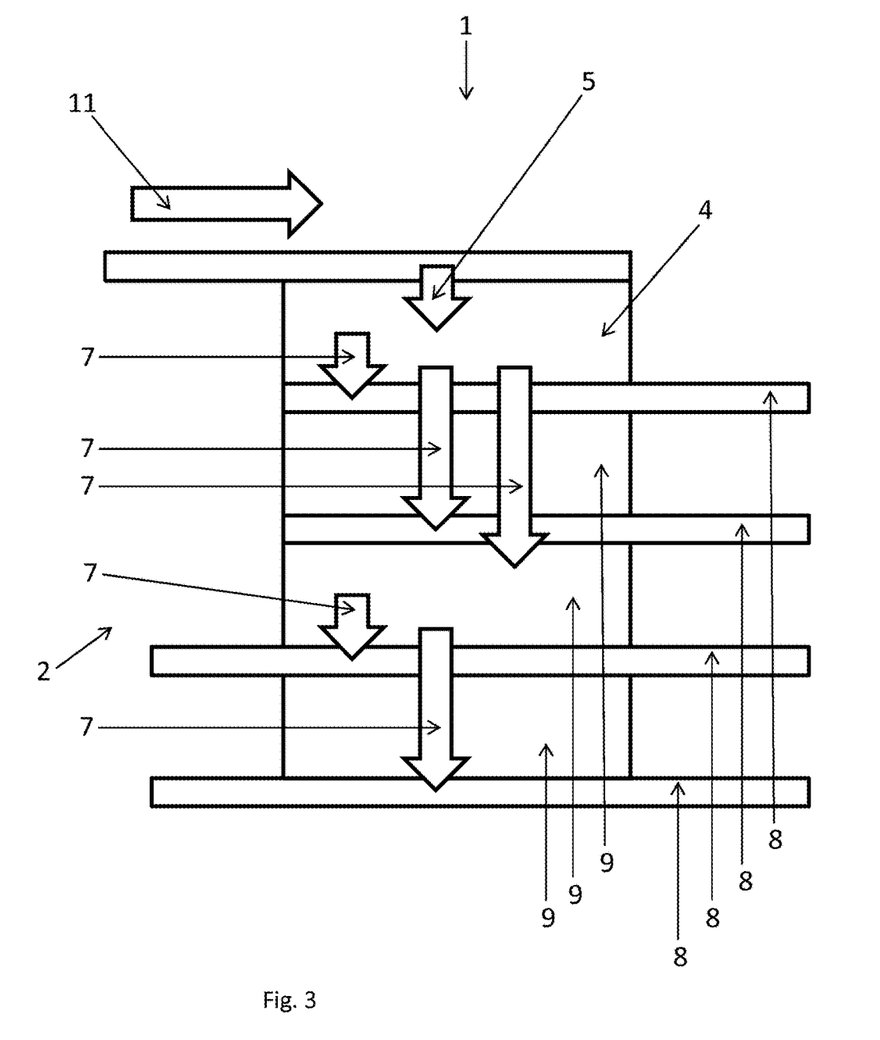
FIG. 3 shows an embodiment with output conveyors that can travel in both directions.

FIG. 3 shows that the output conveyors 8 or movement means, or receiving zones, can be separated by transfer surfaces 9. Thus, in the direction perpendicular to the conveying direction 11, there is found the series of an upstream conveying means 2, an accumulation surface 4, then movement means and transfer surfaces 9, these elements being flush.

The advantage of such a transfer surface 9 is the possibility of providing output conveyors 8 that are parallel to one another, placed apart with the same spacing as that of the downstream stations of the conveying device 1. Downstream from the conveying device 1, a block of handling stations can, in fact, be installed. These stations are then next to one another, in particular perpendicular to the conveying direction 11. They are placed with a certain spacing, defined by their structure, and for reasons of simplicity of conveying, it is then advantageous to provide linear conveyors, without curve, to feed them.

This results in a series of output conveyors 8 of the conveying device 1 that are linear, parallel to one another, placed successively perpendicular to the conveying direction 11 with a spacing that reproduces the spacing of the stations of the block that is fed. To avoid curves for the output conveyors 8, the conveying device 1 therefore has transfer surfaces 9 between the output conveyors 8, so that they are linear and repeat the spacing of the block.

All of the output conveyors 8 and the at least one transfer surface 9 are flush and then form a plane on which the offloading means 7 causes the products 3 that it removes from the accumulation surface 4 to slide.

Since the offloading means 7 does not lift the products 3 from this plane, a batch deposited on an output conveyor 8 must not, however, impede access to an output conveyor 8 farther away in this sweeping movement. A solution is, for example, to ensure that the batch that is deposited is removed early enough not to interfere with the passage of the following batch. The movement means on which the offloading means 7 has brought the products 3 is then set in motion while the offloading means 7 goes to search for another batch of products 3 to deposit on a movement means located in a receiving area that is farther beyond.

The transfer surface 9 can serve as an accumulation zone. For example, products 3 can be deposited there before being taken up later to be brought onto the intended output conveyor 8. This may be necessary if, considering the process requirements, the offloading means 7 does not have the time to bring the batch of products 3 to an output conveyor 8 that is too far away. This may also be necessary to create on the transfer surface 9 a batch of greater size than the one removed from the accumulation surface 4, for example.

The offloading means 7 therefore acts downstream from the at least one accumulation surface 4 to remove from it products 3 by batch and to deposit them ultimately on one or the other movement means of the downstream conveying means 6, in the area of the receiving zones.

The offloading means 7 has at least one tool 10 that can be moved perpendicular to the conveying direction 11, along the output conveyors 8 and the optional transfer surfaces 9. This tool caps the products 3 to be removed from the accumulation surface 4 by a movement that is perpendicular to said surface, then shifts them by a movement that is parallel to said surface, perpendicular to the conveying direction 11. The tool 10 is then released upward from the products 3 that it deposits and returns for a new cycle.

The offloading means 7 can thus have a single tool 10, whose range of movement makes it possible for it to reach all of the receiving zones and possibly at least one transfer surface 9.

In certain embodiments, the offloading means 7 has a plurality of different tools 10, in particular tools 10 that work one after the other. Thus, the products 3 are removed from the accumulation surface 4 as part of the work cycle of a first tool 10. They are deposited onto a transfer surface 9, or even a movement means, and are then taken by another tool 10 from the offloading means 7. Ultimately, a tool 10 deposits them on the desired output conveyor 8. It is thus possible to have several tools 10 that work concurrently in relation to one another, which is advantageous when the distances to be covered by the products 3 are possibly long transversely to the conveying direction 11.

Figure 4:
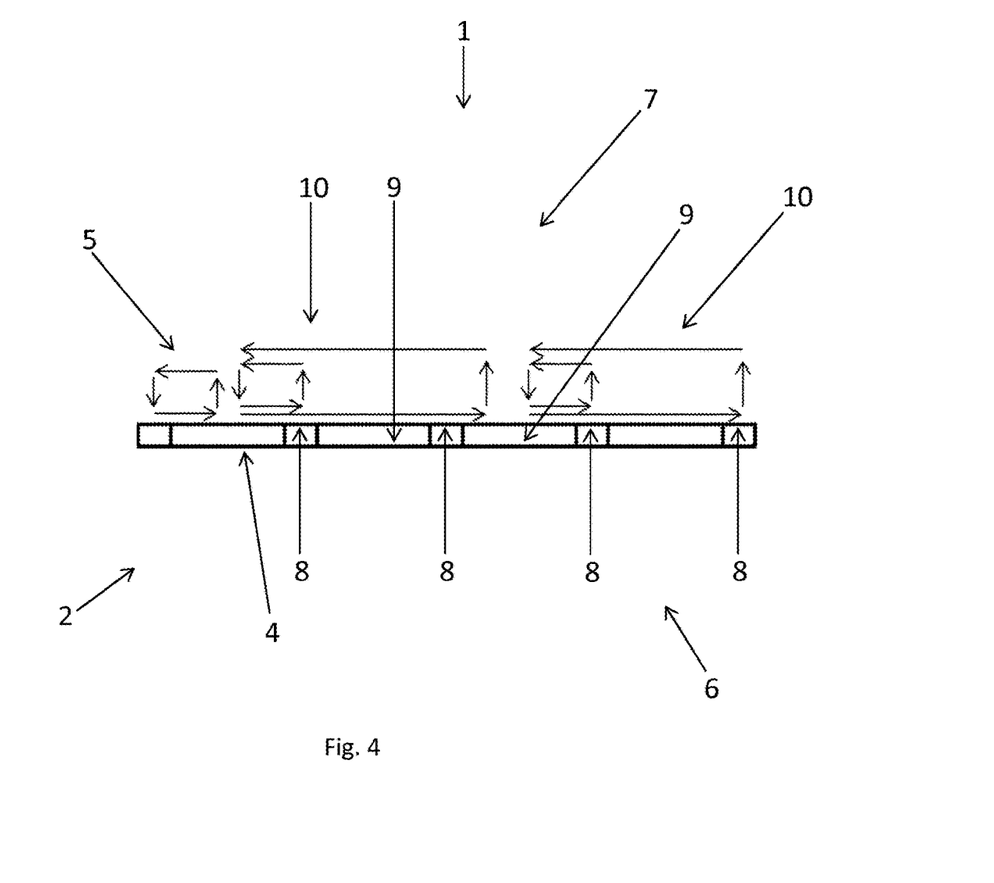
FIG. 4 illustrates possible cycles for the tools of the offloading means.

FIG. 4 thus shows possible operating cycles for two tools 10: a loading cycle for the loading means 5, between the upstream conveying means 2 and the accumulation surface 4, an offloading cycle between the accumulation surface 4 and a transfer surface 9, then a second offloading cycle, from this transfer surface 9 as far as into the final receiving zone.

In this figure, the loading means 5 has an operating cycle in the area of the upstream conveying means 2 and of the nearby accumulation surface 4. The offloading means 7 has two tools 10. The first tool 10 can search for the products 3 on the accumulation surface 4 and deposit them, after a short cycle, directly onto the movement means 8 adjacent to the accumulation surface 4. It can also have a slightly longer cycle, not shown, and deposit the products 3 on a transfer surface 9 just after this movement means. With a still slightly greater cycle, this same tool 10 deposits the products 3 on the following transfer surface 9.

The other tool 10 can then recover the products 3 on this transfer plate 9, on which they optionally accumulate, and bring them onto the output conveyor 8 just after, or bring them onto the last output conveyor 8, even after the third transfer surface 9.

In the case where the offloading means 7 works with several successive tools 10, the products 3 can be deposited while in waiting mode between two tools 10 on a transfer surface 9 or in a receiving zone, in waiting mode, then stopped on a movement means.

In the configuration of FIG. 5, the conveying device 1 ensures the linking between two upstream stations and three downstream stations. The upstream conveying means 2 has two different input conveyors 12, each one bringing the products 3 from a single machine. The conveying device 1 comprises a plurality of accumulation surfaces 4: one of them is adjacent to one of the input conveyors 12, two others are adjacent to the other input conveyor 12, each one on a side.

The downstream conveying means 6 comprises three output conveyors 8 and a transfer surface 9: from the first input conveyor 12, an output conveyor 8 directly after one of the accumulation surfaces 4, then a transfer surface 9, another output conveyor 8; from the second input conveyor 12, an output conveyor 8 located adjacent to each accumulation surface 4 that it borders.

It will be noted that it is thus possible that the same receiving zone is fed by different input conveyors 12, and therefore by different upstream machines, each machine delivering optionally different products 3.

As a result of the invention, it is thus possible to feed, from a single stream of products, different machines located downstream in a controlled manner. The staggering between the products is avoided, and each machine can have its own input stream size. A particularly useful application can be between an upstream machine that delivers finished products 3 by unit, such as a blower labeler of a plastic bottle of liquid, and bundling stations requiring products 3 organized into separate lanes of a product 3.

The offloading means 7 can comprise a set of sliding channels perpendicular to the conveying direction 11 and parallel to the accumulation surface 4. These sliding channels can extend above the entire series of receiving zones where the movement means come or are found, with optionally at least one transfer surface 9. The same sliding channel set can be used for several tools 10 having action zones distributed successively perpendicular to the conveying direction 11.

Although the above description is based on particular embodiments, it is in no way limiting of the scope of the invention, and modifications can be made, particularly by substitution of technical equivalents or by a different combination of all or part of the characteristics developed above.

The invention claimed is:

1. Conveying device (1) comprising an upstream conveying means (2) to receive products (3) from at least one upstream station, an accumulation surface (4) along which the upstream conveying means (2) travels, a loading means (5) to move the products (3) from the upstream conveying means (2) onto the accumulation surface, a downstream conveying means (6) to remove the products (3), as well as an offloading means (7) to move the products (3) from the accumulation surface (4) onto the downstream conveying means (6), wherein
the downstream conveying means (6) comprises a plurality of independent movement means that receive the products (3) in receiving zones that are successively distributed from the edge of the accumulation surface (4) that is opposite the one along which the upstream conveying means (2) extends.

2. Conveying device (1) according to claim 1, where
at least one independent movement means takes the form of an autonomous moving cart, which, to receive the products (3) from the offloading means (7), is temporarily placed in one of the receiving zones, and is moved to remove them.

3. Conveying device (1) according to claim 2, where
at least one independent movement means takes the form of an independent linear output conveyor (8), extending from one of the receiving zones.

4. Device according to claim 2, wherein
the offloading means (7) is able to deposit products (3) in at least two different receiving zones.

5. Device according to claim 2, wherein
it comprises, for at least one pair of successive receiving zones, a transfer surface (9) mounted between them.

6. Conveying device (1) according to claim 1, where
at least one independent movement means takes the form of an independent linear output conveyor (8), extending from one of the receiving zones.

7. Device according to claim 6, where
the at least one output conveyor (8) can travel, depending on the case, in one direction or the other.

8. Device according to claim 7, wherein
the offloading means (7) is able to deposit products (3) in at least two different receiving zones.

9. Device according to claim 6, wherein
the offloading means (7) is able to deposit products (3) in at least two different receiving zones.

10. Device according to claim 6, wherein
it comprises, for at least one pair of successive receiving zones, a transfer surface (9) mounted between them.

11. Device according to claim 1, wherein
the offloading means (7) is able to deposit products (3) in at least two different receiving zones.

12. Device according to claim 1, wherein
it comprises, for at least one pair of successive receiving zones, a transfer surface (9) mounted between them.

13. Device according to claim 12, where
the offloading means (7) is able to dump products (3) onto the at least one transfer surface (9).

14. Device according to claim 1, where
the offloading means (7) comprises a single tool (10), which can remove products (3) in each of the receiving zones.

15. Device according to claim 1, where
the offloading means (7) comprises at least two separate tools (10), which handle the products (3) successively.

16. Device according to claim 15, where
at least one transfer surface (9) forms a buffer zone where products (3) can be stored temporarily in an intermediate way between the accumulation surface (4) and the independent movement means that must remove them.

17. Device according to claim 16, where
the at least one transfer surface (9) is a motorized carrying surface and carries the products (3) transversely in the direction of the independent movement means.

18. Method for conveying products (3) traveling on an upstream conveying means (2) that carries them in a single-line column in a conveying direction (11), then onto a parallel downstream conveying means (6), comprising steps of loading an accumulation surface (4) by pushing the products (3) there transversely from the upstream conveying means (2), offloading the accumulation surface (4) by moving the products (3) transversely onto the downstream conveying means (6), removing the products (3) as a result of the movement of the downstream conveying means (6), wherein the downstream conveying means (6) comprises a plurality of independent movement means, the products (3) being offloaded by batch on one or the other of these independent movement means.

19. Method according to claim 18, where
the removal of products (3) from the accumulation surface (4) onto the independent movement means is composed of several successive cycles of transverse movement, each carried out by a different tool (10).

20. Method according to claim 19, further comprising,
between two movement cycles, at least one additional step for accumulation of products (3) after they are taken onto the accumulation surface (4) and before they are deposited on an independent movement means.

* * * * *